US006141023A

United States Patent [19]

Meinerth et al.

[11] Patent Number: 6,141,023

[45] Date of Patent: Oct. 31, 2000

[54] EFFICIENT DISPLAY FLIP

[75] Inventors: Kim A. Meinerth, Granite Bay; Aditya Sreenivas, El Dorado Hills; Krishnan Sreenivas, Rancho Cordova, all of Calif.; John A. Carey, Winter Springs, Fla.

[73] Assignee: Intel Corporation, Santa Clara, Calif.

[ * ] Notice: This patent is subject to a terminal disclaimer.

[21] Appl. No.: 09/016,795

[22] Filed: Jan. 30, 1998

[51] Int. Cl.[7] .......... G06F 12/00

[52] U.S. Cl. .......... 345/514; 345/213; 345/522

[58] Field of Search .......... 345/501, 507, 345/513–516, 522, 213; 395/681, 682; 709/301, 302

[56] References Cited

U.S. PATENT DOCUMENTS

| | | | |
|---|---|---|---|
| 4,598,384 | 7/1986 | Shaw et al. | 345/116 |
| 5,440,746 | 8/1995 | Lentz | 345/507 |
| 5,481,276 | 1/1996 | Dickey et al. | 345/132 |
| 5,745,761 | 4/1998 | Celi, Jr. et al. | 345/522 |

*Primary Examiner*—Kee M. Tung

*Attorney, Agent, or Firm*—Blakely, Sokoloff, Taylor & Zafman LLP

[57] ABSTRACT

An apparatus for an efficient display flip is disclosed. The apparatus has a computer readable medium having a graphics driver. The execution of the graphics driver is configured to generate instructions for checking status of a graphics device to determine whether the graphics device is ready to display a next frame data on a display device. The graphics device is coupled to a system memory. The graphics device is configured to forwarding a display flip status to the system memory for access by the graphics driver in response to the instructions.

16 Claims, 6 Drawing Sheets

TO FIG. 5B

EFFICIENT DISPLAY FLIP

BACKGROUND OF THE INVENTION (1) Field of the Invention

The present invention is related to the field of memory access, more specifically, the present invention is a method and apparatus for an efficient display flip for a graphics device.

(2) Related Art

Smooth motion graphics is desirable for display of computer graphics such as for three dimensional animation. In order to ensure delivery of smooth motion graphics, a primary display engine of a graphics device on a computer must be provided with successive next frame data in a timely manner.

A display flip refers to when a primary display engine of a graphics device is ready to process a next frame data for display on a display device. A graphics driver for the graphics device typically provides information for the next frame to be displayed to the graphics device after a display flip occurs. Currently, a processor is required to notify the graphics driver of the display flip status by accessing internal registers of the graphics device to determine when a display flip has occurred. This approach typically involves the processor sending a request to the graphics device.

Display flips occur successively while the primary display engine is processing next frame data for display. The processor is therefore required to initiate numerous read operations to the graphics device for display flip status requiring both processor as well as bus time. The prior art therefore takes bus processing time away from other devices and processor time away from other applications.

A method and apparatus is therefore desired which obviate the need for the processor to perform reads to internal registers in the graphics while still making the display flip information available to the graphics driver.

BRIEF SUMMARY OF THE INVENTION

An apparatus for an efficient display flip is disclosed. The apparatus has a computer readable medium having a graphics driver. The execution of the graphics driver is configured to generate instructions for checking status of a graphics device to determine whether the graphics device is ready to display a next frame data on a display device. The graphics device is coupled to a system memory. The graphics device is configured to forwarding a display flip status to the system memory for access by the graphics driver in response to the instructions.

DETAILED DESCRIPTION OF THE INVENTION

The present invention is a method and apparatus for an efficient display flip. A display flip refers to when a primary display engine is ready to process a next frame data for display. The present invention obviates the need for a graphics driver to have a processor fetch the display flip status from the graphics device. More specifically, the present invention provides the display flip status to a cacheable location in system memory for easy access by the graphics driver.

Figure 1:
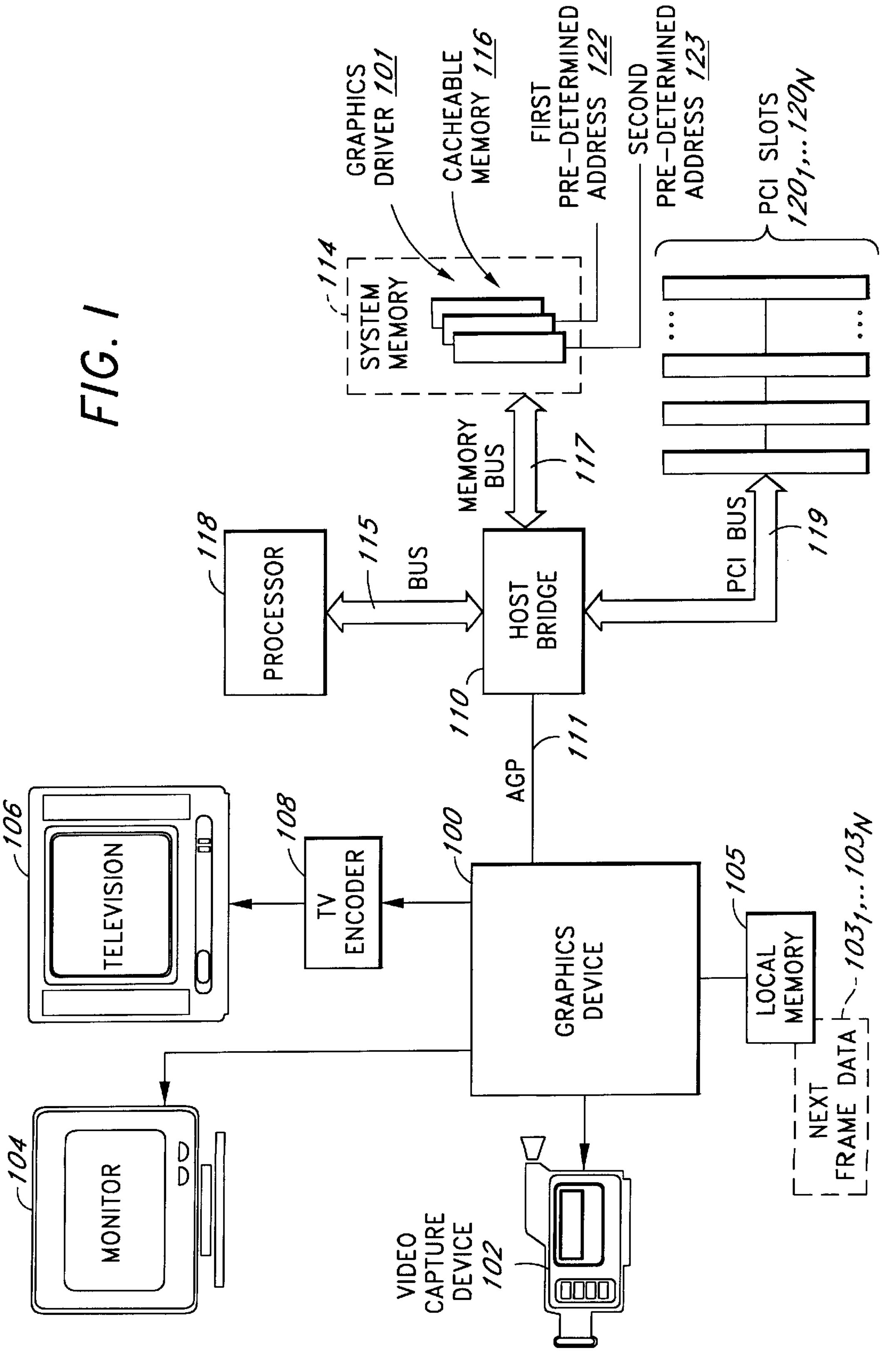
FIG. 1 is a system block diagram illustrating the present invention's graphics device.

FIG. 1 is a system block diagram illustrating the present invention's graphics device. A display flip indicates that a primary display engine (not shown) of a graphics device 100 is ready to process the next frame data for display. When a display flip occurs, the graphics device 100 processes a plurality of next frame data $\mathbf{103}_1 \ldots \mathbf{103}_N$ stored in a local memory 105 for display. The next frame data $\mathbf{103}_1 \ldots \mathbf{103}_N$ are processed for display on a computer monitor 104 or a television 106 through an encoder 108.

The present invention's graphics device 100 is capable of accessing system memory 114 with cacheable memory 116 through peripheral component interconnect (PCI) devices $\mathbf{120}_1 \ldots \mathbf{120}_N$. In one embodiment, the PCI devices $\mathbf{120}_1 \ldots \mathbf{120}_N$ are input/output hardware devices that are connected to the system through, for example, a PCI expansion connector (not shown). Examples of PCI devices include but are not limited to a graphics controller/card, a disk controller/card, a local area network (LAN) controller/card and a video controller/card.

The AGP 111 is a point to point connection between the graphics device 100 and a host bridge 110 and is designed to optimize the graphics data transfer operations in high speed personal computers (PC). The host bridge 110 allows various devices including the graphics device 100, the processor 118 and the peripheral component interconnect (PCI) devices $\mathbf{120}_1 \ldots \mathbf{120}_N$ to retrieve and forward data to and from the system memory 114.

The processor 118 is coupled to the host bridge 110 through a bus 115. The system memory 114 is coupled to the host bridge 110 through a bus 117. The PCI devices $\mathbf{120}_1 \ldots \mathbf{120}_N$ are coupled to the host bridge 110 through a bus 119. The processor 118 may be a Pentium® II processor.

A graphics driver 101 generates graphics instructions, graphics data, staring address of graphics data and graphics status information for use by the graphics device. Once generated, the graphics instructions and graphics (next frame) data are forwarded to the AGP 111 for storage in the graphics device's local memory 105 including internal registers. The start address and status information are forwarded to the PCI devices $\mathbf{120}_1 \ldots \mathbf{120}_N$ for storage in a cacheable memory 116 in the system memory 114. The cacheable memory 116 has a first predetermined address 122 and a second predetermined address 123 for storing display flip status information accessible by the graphics driver 101.

Figure 2:
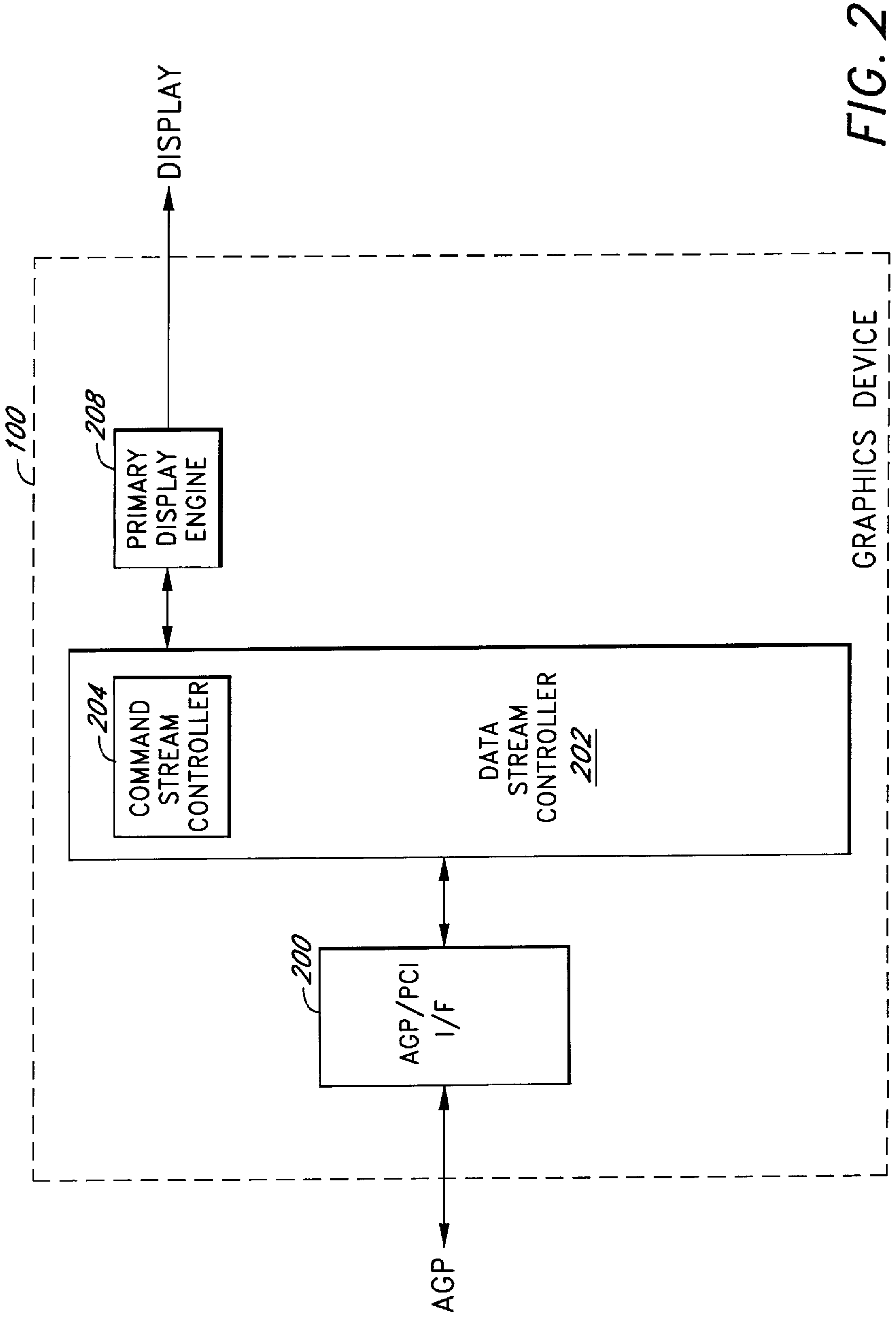
FIG. 2 is one embodiment of a process flow of the graphics device.

FIG. 2 is a block diagram of the graphics device of the present invention. The graphics driver generates a front buffer instruction and a store double word instruction to facilitate the successive processing of next frame data by the primary display engine 208 for display of smooth motion computer graphics. The next frame data is located in local memory. The front buffer instruction provides the starting address of the next frame data to the primary display engine 208.

Once the graphics driver generates the front buffer instruction, it begins polling a second predetermined address in cacheable memory until feedback is returned indicating that both the front buffer and the store double word instructions have been processed.

While the graphics driver is polling the second predetermined address the front buffer and the store double word instructions are forwarded to the graphics device 100 through the host bridge. In the graphics device, the instructions are forwarded to a data stream controller 202 through an AGP/PCI interface block 200. The data stream controller 202 consists of a number of units which handle the interface between the primary display engine 208 and the AGP/PCI ports. The AGP/PCI interface block 200 facilitates the transmission of data between the data stream controller 202 and the AGP and the PCI bus. The two instructions are processed by a command stream controller 204 of the data stream controller 202. The command stream controller 204 is the instruction decoder for the graphics device and is described in detail in FIG. 3 and the accompanying text.

Figure 3:
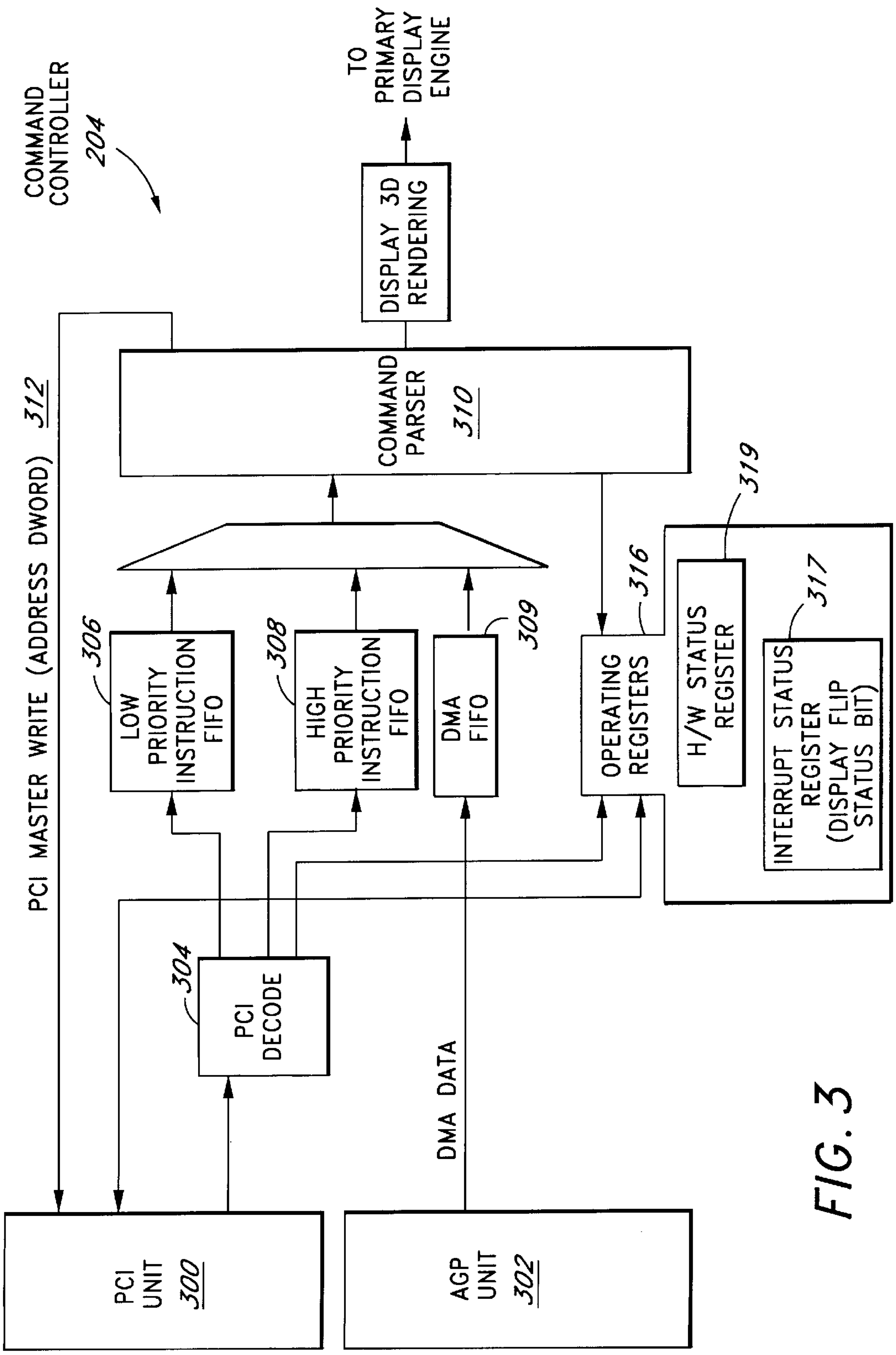
FIG. 3 illustrates a command stream controller of the graphics device.

FIG. 3 illustrates an exemplary command stream controller of the present invention. Once generated by the graphics driver, the front buffer instruction is first forwarded to the command stream controller of the graphics device. The store double word instruction is generated after the front buffer instruction and is also forwarded to the command stream controller. The command stream controller processes the store double word instruction after it processes the front buffer instruction.

If the instructions are received through the PCI unit 300, the instructions are decoded by a PCI decoder 304 and transmitted to either a low priority instruction first-in first-out (FIFO) 306 or a high priority instruction FIFO 308 depending upon the priority of the instruction being processed. Priority is predetermined by the system designers of the particular computer system being designed. If the instructions are received through an AGP unit 302 of the command stream controller, the instructions are sent to a direct memory access (DMA) FIFO 309.

The first instruction transmitted for processing is the front buffer instruction. The front buffer instruction which has the starting address of the next frame data is parsed through a command parser 310. The command parser 310 forwards the starting address of the next frame data to the primary display engine. The primary display engine stores the starting address in a register (not shown) until it is ready to process the next frame data.

The front buffer instruction also causes an interrupt status register 317 to be updated in an operating register block 316. More specifically, the front buffer instruction causes the command parser to generate a bit change operation which changes a display flip status bit in the interrupt status register 317 from a 0 to a 1 indicating that a display flip is pending in the primary display engine.

After the interrupt status register 317 is updated, the command parser 310 performs a PCI master write 312 of the display flip status bit to a first predetermined address in cacheable memory. The first predetermined address is designated by a hardware status vector address register 318 of the operating registers 316.

The store double word instruction generated by the graphics driver is also forwarded to the command parser 310 of the command controller following the front buffer instruction. The store double word instruction causes the command parser 310 to generate another PCI master write 312 of a instruction completion indicator data to a second predetermined address in cacheable memory. The second predetermined address and the instruction completion indicator data are provided by the store double word instruction.

Upon receiving the instruction completion indicator data through the PCI master write 312, the PCI unit 300 writes the instruction completion indicator data to the second predetermined address in cacheable memory. Once the instruction completion indicator data has been written to the second predetermined address, the graphics driver which has been polling the second predetermined address finds the instruction completion indicator data and is therefore notified that both the front buffer instruction and the store double word instruction have been processed by the graphics device.

The graphics driver then begins to poll the first predetermined address in cacheable memory until it finds the display flip status bit in the first predetermined address changed from a 1 to a 0 indicating that a display flip has occurred.

While the graphics driver is polling the first predetermined address, the primary display engine may become ready to process the next frame data. Once the primary display engine is ready to process the next frame data, the primary display engine generates a vertical synchronization signal. The vertical synchronization signal causes the command parser 310 to generate a bit change operation which changes the display flip status bit in the interrupt status register from a 1 to a 0 indicating that a display flip has occurred.

The status change in the interrupt register causes the command parser 310 to perform a PCI master write 312 to the first predetermined address in cacheable memory which changes the status bit in the first predetermined address from a 1 to a 0 indicating that a display flip has occurred. The graphics driver which has been polling the first predetermined address in cacheable memory finds that the status bit has changed from a 1 to a 0 indicating that a display flip has occurred. The graphics driver may now initiate the processing of a new frame data by generating a new front buffer instruction followed by a new store double word instruction and the process repeats until there are no more next frame data to process.

Figure 4:
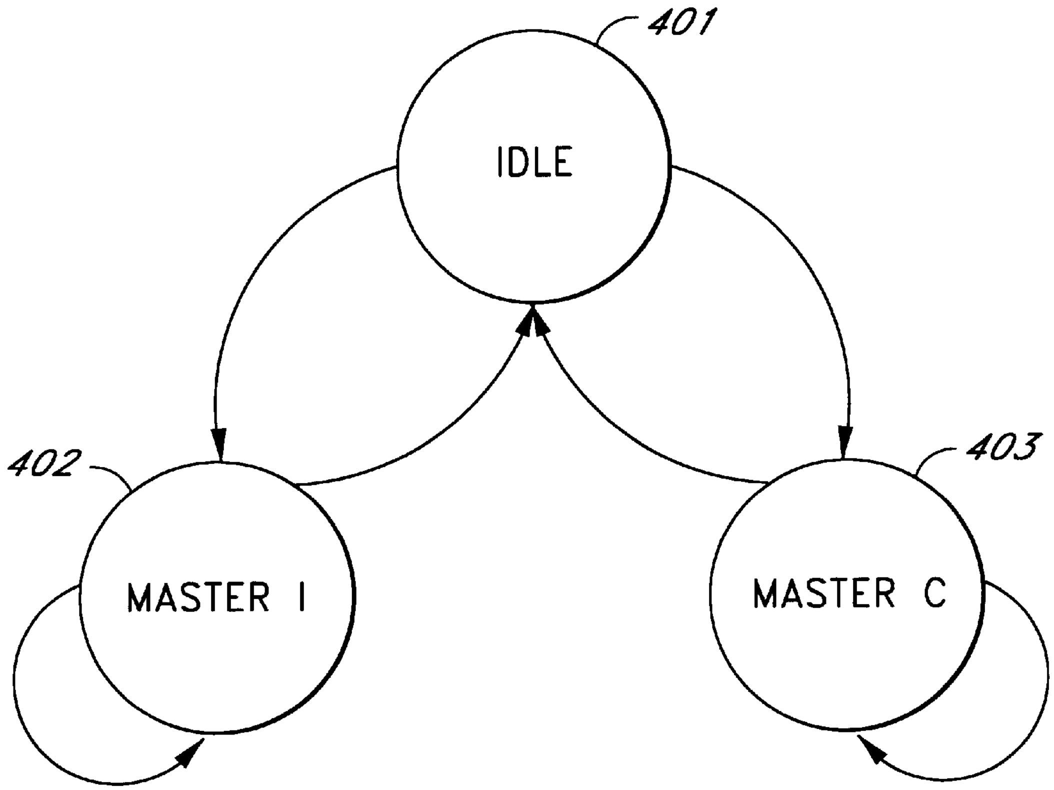
FIG. 4 is a state machine illustrating the function of the present invention's front buffer instruction and store double word instruction.

FIG. 4 is a state machine illustrating the functions of the present invention's front buffer instruction and store double word instruction. The state machine has two portions. Namely, the transition between state 401 and state 402 represents state changes caused by the front buffer instruction and the transition between state 401 and state 403 represents state changes caused by the store double word instruction.

In response to the front buffer instruction, the state machine transitions from an idle state 401 to a master write state 402. The front buffer instruction causes the command parser to generate a bit change operation which changes the display flip status bit from a 0 to a 1 in an interrupt status register indicating that a display flip is pending. The front buffer instruction also causes the command parser to generate a PCI master write to a first predetermined address in cacheable memory. The first predetermined address is provided by a hardware status vector address register. The status bit in the first predetermined address is changed from a 0 to a 1 indicating that a display is pending. The state machine returns to an idle state 401 and waits in this state until the primary display engine is ready to process a next frame data.

While the master write of the front buffer instruction is pending, a store double word instruction generated by the graphics driver transitions the other half of the state machine from an idle state 401 to a master write 403. The store double word instruction causes a second PCI master write to be performed. The state machine waits in this state until the write operation occurs. The second PCI master write writes an instruction completion indicator data in a second predetermined address in cacheable memory to indicate that the front buffer instruction has been processed. The second predetermined address and the instruction completion indicator data is provided by the store double word instruction.

Once the store double word instruction has completed its PCI master write, the state transitions from a master write state 403 back to an idle state 401. The graphics driver then begins polling the first predetermined address in cacheable memory until the status bit changes from a 1 to a 0 indicating that the display flip has occurred.

A vertical synchronization signal is generated by the primary display engine when the primary display engine is ready to process the data for the next frame to be displayed. When the vertical synchronization signal is generated, the primary display engine flips and takes the starting address provided by the front buffer instruction and fetches the next frame data from local memory.

The generation of the vertical synchronization signal causes the command parser to generate a bit change operation. The bit change operation causes the status bit in the interrupt status register to change from a 1 to a 0 indicating that a display flip has occurred.

In response to the change in the status bit in the interrupt status register, the command parser generates a PCI master write of the new status bit to the first predetermined address in cacheable memory and the state transitions from an idle state 401 to a master write state 402. The PCI unit acknowledges the PCI master write and the state machine returns to the idle state 401 when the write of the new status bit to the first predetermined address in cacheable memory completes.

The graphics driver then finds that the display flip status bit in the first predetermined address in cacheable memory has changed from 1 to a 0 indicating that a display flip has occurred. The graphics driver generates a new front buffer instruction for the next frame data and the entire process repeats for subsequent next frame data.

Figure 5A:
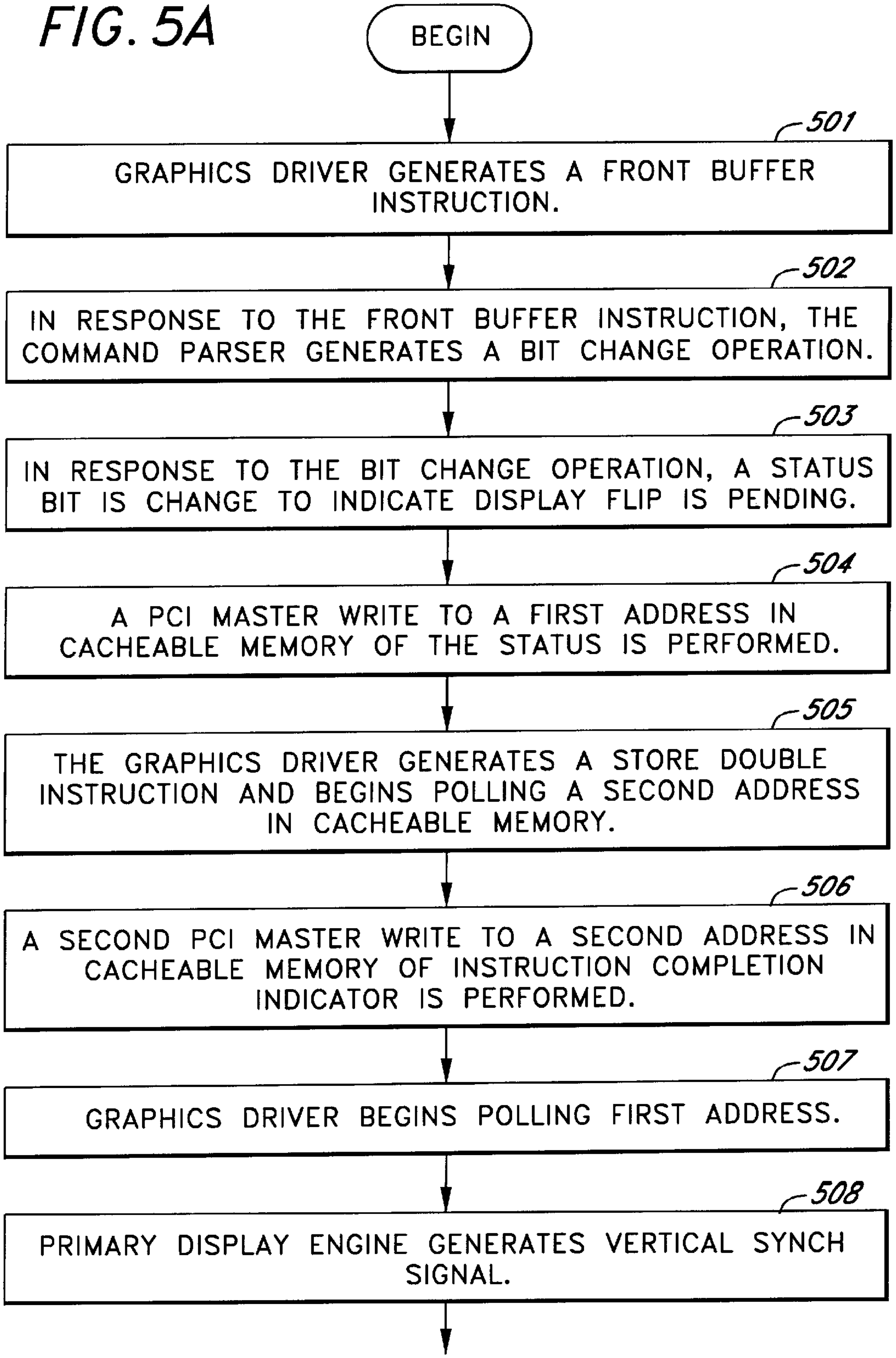
FIGS. 5A and 5B are flow diagrams illustrating the general steps followed by the present invention.
Figure 5B:
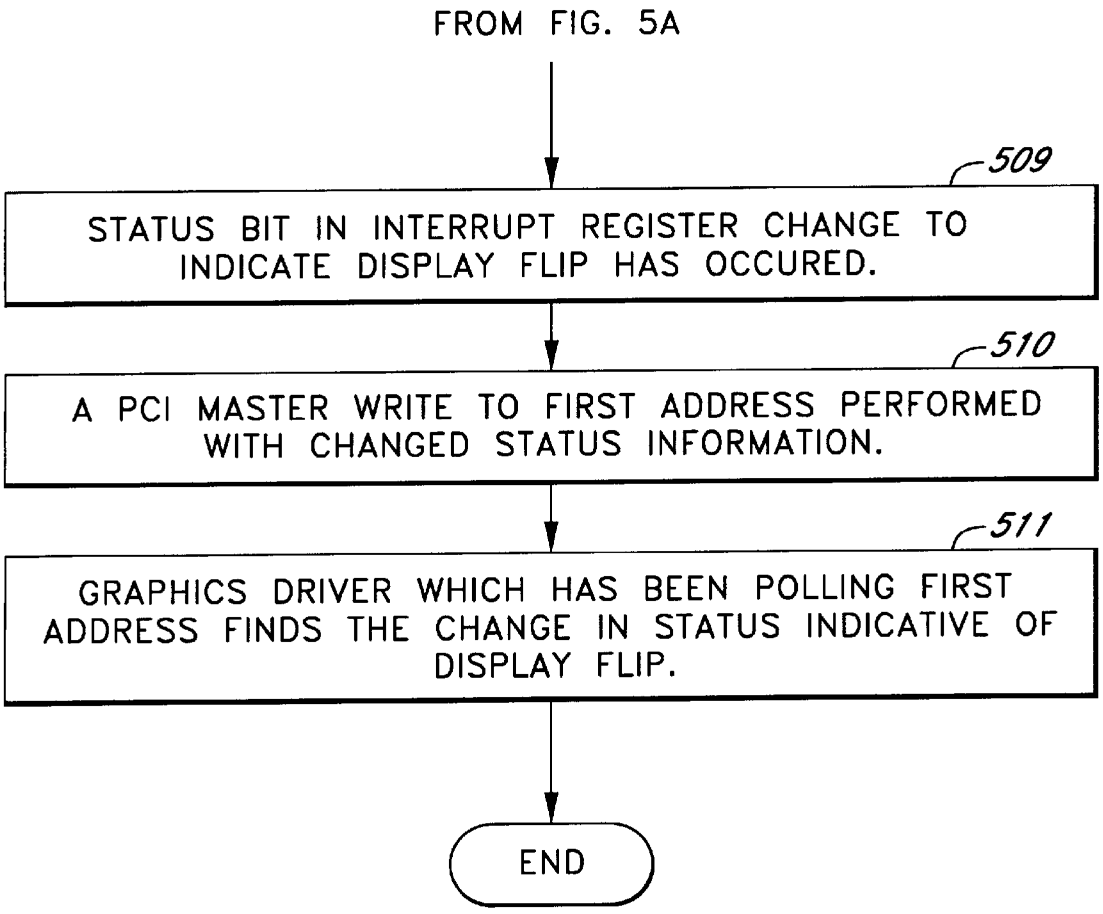

FIG. 5 is a flow diagram illustrating the general steps followed by the present invention. In step 501, the graphics driver for the graphics device generates a front buffer instruction in preparation for the next frame data to be processed by the graphics device and initializes a second predetermined address in cacheable memory. The front buffer instruction is provided to the graphics device through its AGP/PCI interface and transmitted to the command parser of the graphics device.

In step 502, in response to the front buffer instruction, the command parser generates a bit change operation in the operating register block. In step 503, in response to the bit change operation, the status bit of the interrupt status register in the operating register is changed from a 0 to a 1 implying that a display flip is pending in the primary display engine.

In step 504, in response to the change in the status bit of the interrupt status register, the operating register block generates a PCI master write signal which enables a PCI write to a first predetermined address in cacheable memory provided by a hardware status vector address register also resident in the operating register.

In step 505, a store double word instruction is generated by the graphics driver to the graphics device through the AGP/PCI interface and is forwarded to the command parser of the graphics device. In step 506, in response to the store double word instruction, the command parser generates a second PCI master write which is to a second predetermined address in cacheable memory for an instruction completion indicator data to notify the graphics driver that the front buffer instruction has been processed by the graphics device and that a display flip is now pending.

In step 507, once the store double word instruction has completed its write operation, the graphics driver begins polling the first predetermined address specified by the hardware status vector address register to determine whether the first predetermined address in cacheable memory contains a status bit of 0 indicating that the display flip has occurred.

In step 508, once the primary display engine is ready for the next frame data, the primary display engine generates a vertical synchronization signal and fetches the next frame data from the front buffer address in local memory. In step 510, the vertical synchronization signal causes the status bit in the interrupt register to change from a 1 to a 0 indicating that the display flip has occurred. In step 511, the change in the status bit in the interrupt status register causes a PCI master write of the status bit in the first predetermined address in memory from a 1 to a 0 indicating that the display flip has occurred.

In step 512, the graphics driver finds that the status bit in the first predetermined address in memory is a 0 indicating that the display flip has occurred. The graphics driver then generates a new front buffer instruction for the next frame data and the process repeats for each successive next frame data to be processed by the primary display engine of the graphics device.

What has been described is a method and apparatus for efficiently notifying a graphics driver when a display flip has occurred. The present invention overcomes the disadvantages of the prior art approach by having the graphics device report its status to cacheable memory. The graphics driver therefore only needs to poll cacheable locations in system memory for the display flip status.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for an efficient display flip comprising the steps of:

checking status of a graphics device to determine whether said graphics device is ready to process a first next frame data for display on a display device;

updating a location in cacheable memory accessible to a graphics driver, said location being updated with said status, said status to be read by said graphics driver to determine when to initiate processing of said first next frame data for display;

generating a first instruction having a starting address of said first next frame data for the next frame to be displayed, said instruction forwarded to said graphics device;

updating a status in an operating register in said graphics device indicating that a display flip is pending, said updating being performed in response to receipt of said first instruction by said graphics device;

performing a first PCI master write of said status to a first cacheable location in system memory accessible to said graphics driver; and generating a second instruction providing a predetermined address and instruction completion data to said graphics device, said generating being performed by said graphics driver.

2. The method of claim 1 further comprising the step of performing a second PCI master write to a second cacheable location in system memory accessible to said graphics driver.

3. The method of claim 2 further comprising the step of polling said second cacheable location in system memory until said second PCI master write completes writing said instruction completion data to said second cacheable location, completion of said second PCI master write indicating to said graphics driver that both said first and said second instructions have been processed by said graphics device.

4. The method of claim 3 further comprising the step of polling said first cacheable location in system memory, said polling performed by said graphics driver.

5. The method of claim 4 further comprising the step of generating a vertical synchronization signal when a display engine residing in said graphics device is ready to process said first next frame data for display, said generating being performed by said display engine.

6. The method of claim 5 further comprising the step of forwarding said vertical synchronization signal to said graphics device, said forwarding being performed by said display engine.

7. The method of claim 6 further comprising the step of generating a third PCI master write to update the status in said first cacheable location in system memory.

8. The method of claim 7 further comprising the step of processing delivery of a starting address for a second next frame data in response to said first cacheable location having said status indicating that a display flip has occurred.

9. An apparatus for an efficient display flip comprising:

a computer readable medium having a graphics driver, execution of said graphics driver configured to generate instructions for checking status of a graphics device to determine whether said graphics device is ready to display a next frame data on a display device, said graphics device coupled to a system memory, said graphics device configured to forward a display flip status to said system memory for access by said graphics driver in response to said instructions, said instructions including a first instruction configured to provide a display engine of said graphics device with a starting address of said next frame data and updating a first predetermined address in said memory accessible to said graphics driver with said display flip status, said display flip status to be read by said graphics driver to determine when to initiate delivery of a starting address of subsequent next frame data for display to said graphics device; and a command stream controller configured to process said instructions and having an operating register residing in said graphics device to which said first instruction causes said display flip status to be updated indicating that a display flip is pending.

10. The apparatus of claim 9 wherein said instructions further comprises a second instruction configured to cause said graphics device to write an instruction completion data to a second predetermined address in said memory, said instruction completion data causing said graphics driver to begin polling said first predetermined address in said memory for said display flip status.

11. The apparatus of claim 10 further wherein said display engine is further configured to generate a vertical synchronization signal when ready to process said next frame data for display, said vertical synchronization signal causing said command stream controller to write said display flip status to said first predetermined address indicating that a display flip has occurred.

12. The apparatus of claim 11 further wherein said graphics driver polling said first predetermined address finds said updated display flip indicating that a display flip has occurred and begins processing for delivery a starting address of said subsequent next frame data.

13. A system for an efficient display flip comprising:

a computer readable medium having a graphics driver, execution of said graphics driver configured to generate instructions for checking status of a graphics device to determine whether said graphics device is ready to display a next frame data on a display device, said graphics device coupled to a system memory, said graphics device configured to forward a display flip status to said system memory for access by said graphics driver in response to said instructions, said instructions comprising a first instruction configured to provide a display engine of said graphics device with a starting address of said next frame data and updating a first predetermined address in said memory accessible to said graphics driver with said display flip status, and said display flip status to be read by said graphics driver to determine when to initiate delivery of a starting address of subsequent next frame data for display to said graphics device; and a processor coupled to said computer readable medium, said processor configured to perform said execution of said graphics driver.

14. The system of claim 13 wherein said instructions further comprises a second instruction configured to cause said graphics device to write an instruction completion data to a second predetermined address in said memory, said instruction completion data causing said graphics driver to begin polling said first predetermined address in said memory for said display flip status.

15. The system of claim 14 further wherein said display engine is further configured to generate a vertical synchronization signal when ready to process said next frame data for display, said vertical synchronization signal causing said command stream controller to write said display flip status to said first predetermined address indicating that a display flip has occurred.

16. The system of claim 15 further wherein said graphics driver polling said first predetermined address finds said updated display flip indicating that a display flip has occurred and begins processing for delivery a starting address of said subsequent next frame data.

* * * * *